United States Patent [19]

Bjork

[11] Patent Number: 4,918,821
[45] Date of Patent: Apr. 24, 1990

[54] METHOD OF DETVRMINIG WHEEL ALIGNMENT

[75] Inventor: Bengt A. Bjork, Novato, Calif.

[73] Assignee: Nicator AB, Sweden

[21] Appl. No.: 219,374

[22] Filed: Jul. 15, 1988

[51] Int. Cl.$^5$ .................... G01B 11/00; G01B 11/26
[52] U.S. Cl. .................................. 33/203.18; 356/155
[58] Field of Search ............ 33/203.18, 203.19, 203.2; 356/155

[56] References Cited

U.S. PATENT DOCUMENTS

| | | | |
|---|---|---|---|
| 2,532,749 | 12/1950 | Aurand et al. | 33/203.18 |
| 3,487,551 | 1/1970 | Eggert et al. | |
| 3,808,695 | 5/1974 | LaMoreux . | |
| 4,134,682 | 1/1979 | Calk | 33/203.18 |
| 4,135,823 | 1/1979 | Horvallius | 356/155 |
| 4,261,108 | 4/1981 | Davis . | |
| 4,337,581 | 7/1982 | Eck | 33/203.18 |
| 4,338,027 | 7/1982 | Eck | 356/155 |
| 4,440,495 | 4/1984 | Bergstrom et al. | 356/155 |
| 4,679,327 | 7/1987 | Fouchey et al. . | |
| 4,690,557 | 9/1987 | Wiklund | 356/155 |
| 4,782,596 | 11/1988 | Mieling | 33/203.18 |

OTHER PUBLICATIONS

"Align-A-Gage" ad from *Autobody Repair News*, Jun. 1987, Steck Manufacturing, Inc.
"Gauge Allows On-Bench Vehicle Adjustment Checks Chamber, Toe & Rear Align" article from *Automotive Body Repair News*, Jun. 1987.

Primary Examiner—William A. Cuchlinski, Jr.
Assistant Examiner—Thomas B. Will
Attorney, Agent, or Firm—Larson and Taylor

[57] ABSTRACT

A method for determining wheel alignment of an automobile includes the initial step of clamping the chassis of the automobile in a measuring bench. After determining a centerline and datum plane for the automobile, a measuring system calibrated to the centerline and datum plane projects a laser beam parallel to the centerline in the datum plane. The laser beam is movable in the datum plane and in a plane perpendicular to the datum plane. The front suspension of each front wheel hub is then lifted to the proper ride height relative to the datum plane. A measuring unit is then mounted to each front wheel hub. The measurement of the camber, caster, SAI/KPI, and toe of each wheel hub is then determined. In addition, the TOOT of the front wheel hubs are determined while the hubs are lifted. Other measurements are possible, including checking the wheel alignment of the rear wheels.

17 Claims, 9 Drawing Sheets

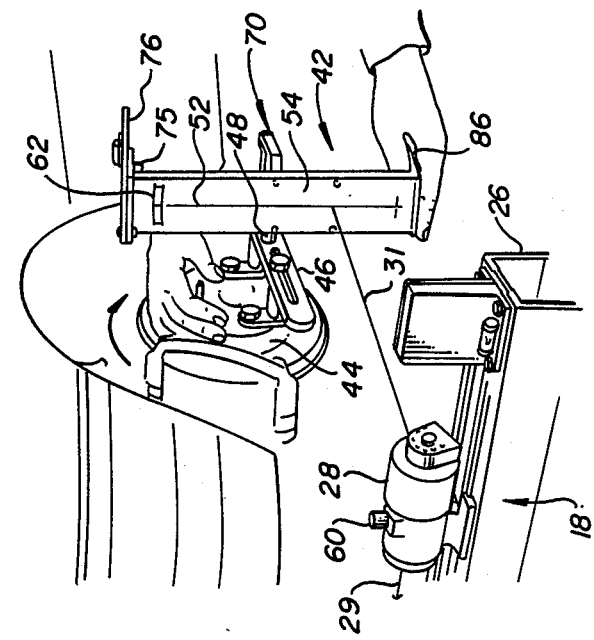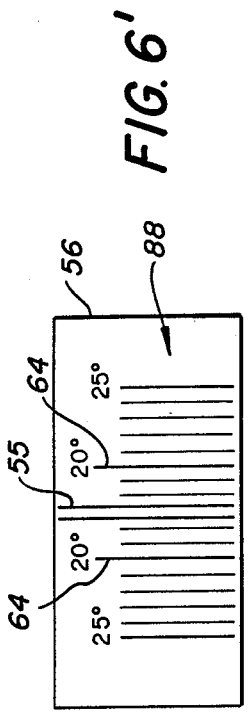

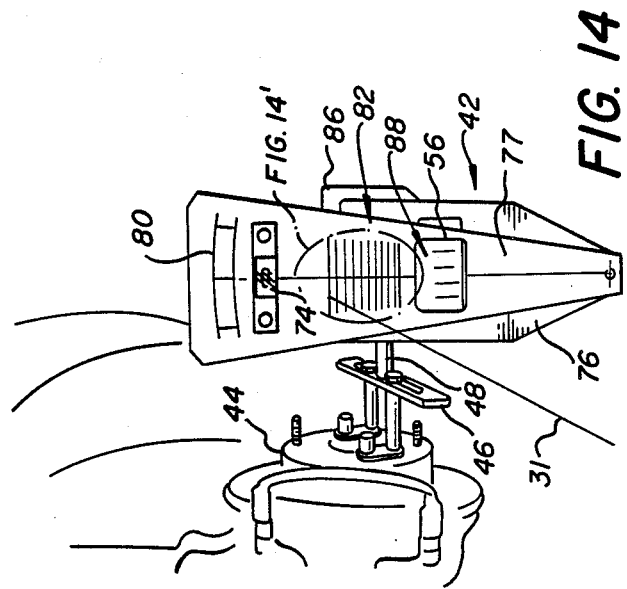
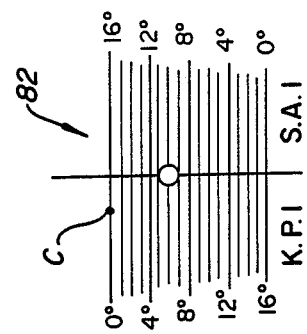
FIG. 14
FIG. 14'
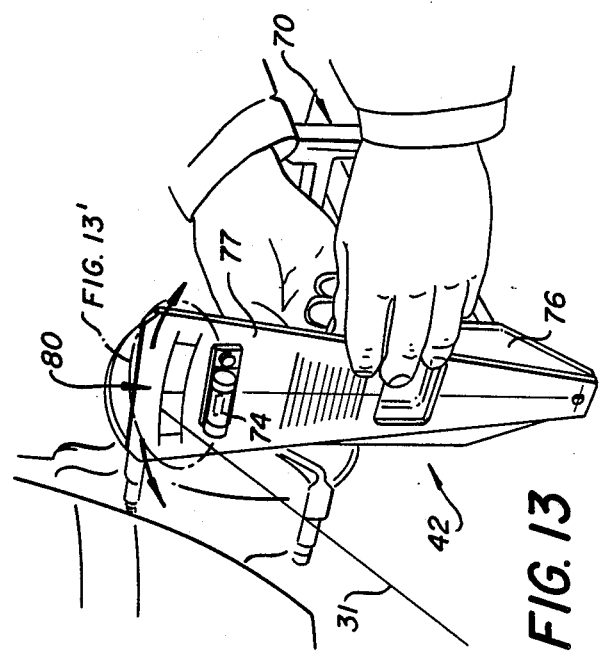
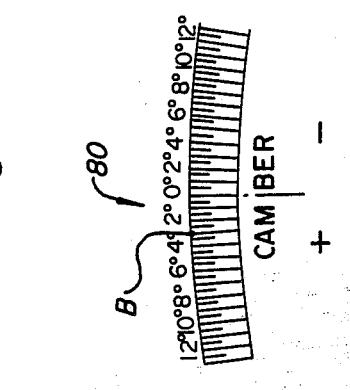
FIG. 13
FIG. 13'

METHOD OF DETVRMINIG WHEEL ALIGNMENT

FIELD OF THE INVENTION

The present invention relates generally to the alignment of the wheels of an automobile, and more particularly to the alignment of the wheel hubs themselves of the automobile without tires or wheels thereon and which is accomplished while the chassis of the automobile is clamped in place.

BACKGROUND OF THE INVENTION

The basic purpose of wheel alignment service is to restore any deviations on the automobile wheel/suspensions to factory specifications. These specifications apply to the vehicle when the suspension is loaded with a normal weight so that the wheels are at a normal ride height relative to a datum plane of the automobile. The ride height of the automobile is controlled by the spring tension of the suspension systems. The suspension systems distribute the weight and act as the basis for all steering geometry angles.

Apart from the wheel alignment angles (camber, caster, steering-axis-inclination (SAI) or Kingpin inclination (KPI), toe in/out, and toe-out-on-turns (TOOT)), there are the vehicle centerline, the geometrical centerline, and the thrust line. All three of these centerlines should coincide with each other.

There are several four-wheel alignment systems currently available, some of which are computerized. Examples of such systems are those manufactured by Bee-Line, Hunter, HP Andersen, Kansas Jack, and Rotary Lift. Although these systems accurately measure wheel alignment and alignment relationships between all four wheels, these measurements are not related to the vehicle itself. Thus, correct four-wheel alignment is not determined because no determination is made that the vehicle centerline coincides with the geometrical centerline which in turn coincides with the rear wheel thrust line.

With the introduction of the unibody design (self-supporting chassis) having MacPherson type suspension, front-wheel and all wheel drive, and independent rear suspensions, accurate wheel alignment has become even more critical. To make matters worse, camber and caster in many cases are not adjustable. In these cases, a very accurate chassis alignment is necessary to obtain acceptable wheel alignment values.

In U.S. Pat. No. 4,261,108 (Davis), a method for determining caster, camber, and toe-in is disclosed. According to this method, the wheel alignment is measured and adjusted without a load on the wheel and then subsequently with a load on the wheel.

In U.S. Pat. No. 3,808,695 (LaMoreux), a testing and measuring apparatus for vehicle wheel front end assemblies is disclosed. A jack is used to support the vehicle and a lever 38 is provided to impart a force onto the bottom of the tire to take up axial play in the ball joints.

In U.S. Pat. No. 4,679,327 (Fouchey et al), an apparatus and method are provided for aligning the front two planes of a motor vehicle. A pair of tie rod adjustment mechanisms including an air cylinder and drive unit are projected along an inclined path so as to enable a pair of adjustment heads to contact serrated adjustment surfaces on the tie rods. The drive pressure holds the heads in place without pushing the tie rod forward to keep from changing camber values which distort toe sets.

In U.S. Pat. No. 3,487,551 (Eggert et al), a device for indicating a condition in an unloaded state of a load carrying ball joint and suspension is provided.

A simple gage engineered to check camber, toe, and rear wheel alignment while a car is still mounted on a repair bench or anchoring system is manufactured by Steck Manufacturing, Inc. of Dayton, Ohio. The gage is in the form of a bar which is horizontally attached to the front-brake disc by magnets. Toe is checked by measuring side-to-side at each end of the bar. The bar is then attached vertically to check the camber setting using a bubble level on the bar.

It has also been disclosed that the wheels of a vehicle can be supported on individual wheel turntables during wheel alignment. However, when the front wheels are turned to the angles necessary to achieve caster measurements (usually 20° in both directions), the vehicle moves sideways and thereby moves the centerline/thrust line affecting the measuring operation.

SUMMARY OF THE INVENTION

In accordance with the present invention, a method of determining wheel alignment for the wheels on an automobile is provided where the body of the automobile is clamped in a measuring or straightening bench or the like. Initially, a centerline and datum plane are determined for the automobile. A measuring system is then calibrated to the centerline and datum plane so that a laser beam projection system is placed adjacent the measuring bench. The laser beam projection system projects a laser beam selectively, either parallel to the centerline in the datum plane or in a plane perpendicular to the datum plane and parallel to the centerline. Each front wheel hub is then lifted to the normal ride height position relative to the datum plane of the automobile so that the associated front suspension is also at the normal ride position. A measuring unit is then mounted on each front wheel hub. Using the measuring unit and the projectable laser beam, the camber, caster, SAI/KPI, and toe of each wheel hub is measured while the associated wheel hub is lifted. The TOOT of the front wheel hubs are also measured in both directions while the wheel hubs are lifted.

Before the calibrating step is performed, it is preferable that the vehicle measurement specifications of the various elements which effect steering geometry be initially checked and any of these elements which vary from specifications be corrected. The wheel hub runout of each front wheel hub is also preferably checked while the wheel hub is lifted and any correction suitably made.

Where the automobile is initially provided with front wheels having tires thereon, the present invention further includes the step of removing the front wheels and tires from the automobile prior to the lifting step.

In addition, after wheel alignment, each wheel hub suspension of each front wheel hub is raised and lowered (jounce/rebound) to determine whether a bump steering condition exists.

The present invention also provides for the checking of the rear wheel hubs. To accomplish this, each rear wheel hub is initially lifted up to the correct riding height, in relation to the datum plane. A measuring unit is then mounted to each rear wheel hub. Next, the camber of each rear wheel hub and toe of each rear wheel hub is measured while the rear wheel hub is lifted. Preferably, before measuring each rear wheel hub, the wheel hub run-out of each rear wheel hub is checked while the rear wheel hub is lifted. In addition, the vehicle rear axial thrust line should also be checked to make sure that it is substantially the same as the vehicle centerline.

It is an advantage of the present invention that wheel alignment adjustments can be made as the final operation after chassis straightening has been accomplished and thus while the vehicle is still mounted on the straightening bench/rack.

It is also an advantage of the present invention that the present method makes use of an existing optical measurement system combined with a straightening bench system while the vehicle suspension system is properly oriented.

It is a further advantage of the present invention that wheel alignment takes place while the wheels are removed. This facilitates measuring, as well as suspension inspection and the performance of wheel alignment adjustments.

Still another advantage of the present invention is that the vehicle centerline and thrust line can be accurately checked to make sure that they coincide before wheel alignment is attempted.

Yet another advantage of the present invention is that with the automobile held in the chassis clamps during wheel alignment, minor adjustments which need to be made to the chassis to obtain correct wheel angles are easily accomplished.

Yet another advantage of the present invention is that a bump steering condition can be determined and corrected while the automobile is locked in the bench.

Other features and advantages of the present invention are stated in or apparent from a detailed description of a presently preferred embodiment of the invention found hereinbelow.

BRIEF DESCRIPTION OF THE DRAWINGS

FIGS. 5 and 6 are schematic perspective views of a step in checking for warping of the left front wheel hub.

FIG. 6' is an exploded view of the angle scale on the measuring unit depicted in FIG. 6.

FIG. 7' is an enlarged view of the top portion of the camber scale depicted in FIG. 7.

FIGS. 8, 9, 10, 11, 12, and 13 are schematic perspective views illustrating steps in performing caster and SAI/KPI measurements of the left front wheel hub.

FIG. 8' is an enlarged view of the measuring unit depicted in FIG. 8.

FIGS. 12' and 13' are englarged views of the caster scale depicted respectively, in the measuring unit of FIGS. 12 and 13.

FIGS. 14 and 15 are schematic perspective views of the SAI/KPI measuring steps of the left front wheel hub.

FIGS. 14' and 15' are enlarged views of the SAI/KPI scales depicted, respectively, in FIGS. 14 and 15.

FIG. 16' is an enlarged view of the toe scale depicted in FIG. 16.

DETAILED DESCRIPTION OF THE PREFERRED EMBODIMENT

Figure 2:
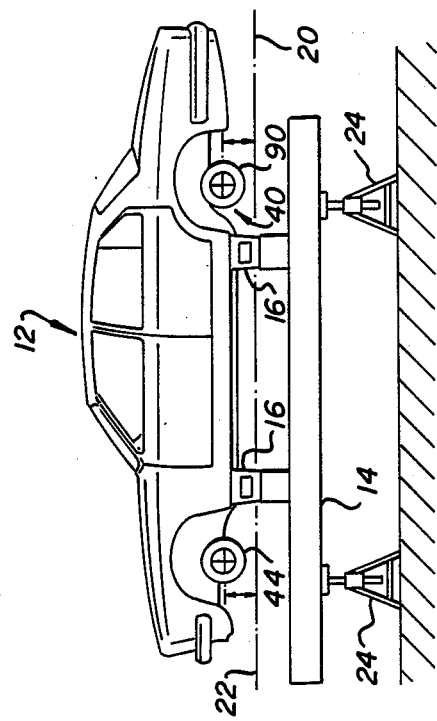
FIG. 2 is a schematic side elevation view of an automobile mounted in a measuring bench.
Figure 1:
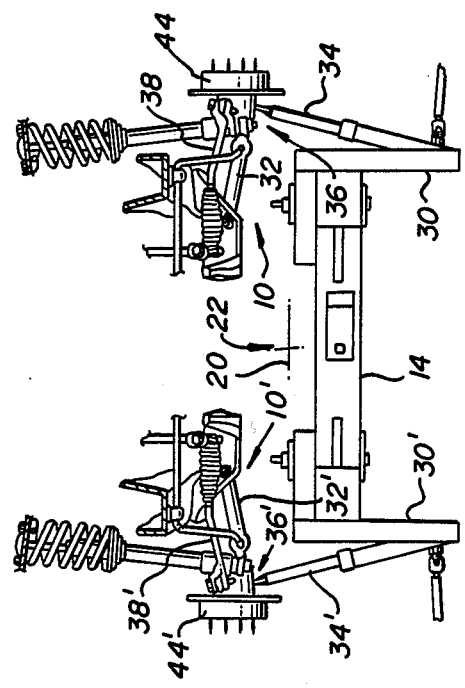
FIG. 1 is a schematic front elevation view of a measuring bench and loaded front suspension of an automobile.

With reference now to the drawings in which like numerals represent like elements throughout the views, front suspensions 10 and 10' of an automobile 12 clamped to a measuring rack or bench 14 are shown in FIGS. 1 and 2. For convenience, identical left and right hand elements of automobile 12 will be identified with the same numerals with the right hand elements further identified with a "'". Measuring bench 14 is conveniently a Dataliner rack or bench such as made by Nicator AB of Sweden. As shown best in FIG. 2, automobile 12 is held to measuring bench 14 by clamps 16.

In many cases, wheel alignment of automobile 12 will be accomplished after straightening of the chassis of automobile 12 has been accomplished on measuring bench 14. The use of measuring bench 14 together with a suitable laser measuring system 18 is known in the art and has been disclosed, for example, in the following patents: U.K. Pat. No. 2,075,185B, U.S. Pat. No. 2,213,963, U.S. Pat. No. 4,556,322, U.S. Pat. No. 4,441,818, U.S. Pat. No. 4,492,471, and U.S. Pat. No. 4,556,332. If such a straightening of the chassis of automobile 12 has been accomplished, then a datum plane 20 including a centerline 22 for automobile 12 have already been determined relative to measuring bench 14. Datum plane 20 is an arbitrarily selected, imaginary plane, parallel to the vehicle rocker panels or sills which is typically positioned slightly below the free hanging hubs and which is used as a reference plane to define all height measurements to various components and designated measuring points of the chassis. Conveniently, datum plane 20 is a horizontal plane, and this is simply accomplished by suitably adjusting variable height jacks 24 supporting measuring bench 14.

Datum plane 20 is conveniently defined first by the projection of a laser beam 29 along a short rail 26 (see, for example, FIG. 5) disposed in front (or rear) of automobile 12 on which a beam splitter 28 is mounted for longitudinal movement therealong. Beam splitter 28 projects a beam 31 of laser light perpendicular to initial beam 29 and also in the horizontal plane. During calibration of short rail 26, projected beam 31 is made parallel to centerline 22 of automobile 12 and hence, movement of beam splitter 28 along short rail 26 thus causes projected beam 31 to define datum plane 20. It should be appreciated that if no adjustment is possible to the rear end thrust line and the thrust line is different from the centerline, then the calibration should be to the thrust line instead of the centerline.

After the chassis has been quickly aligned to the vehicle measurement specifications, inspection and necessary corrections must also be made on those parts which directly influence the steering geometry of automobile 12. Thus, ball joints, wheel bearings, and all steering linkage and gear must be inspected for excessive play, looseness, or damage, and appropriate corrections made.

Once the vehicle chassis and the steering geometry parts are determined to be satisfactory, wheel alignment procedure begins. Initially, as shown in FIG. 1, specially designed suspension support brackets 30 and 30' are mounted to measuring bench 14 below suspension lower arms 32 and 32'. Suitable hydraulic cylinders 34 and 34' are respectively received at one end in support brackets 30 and 30', and at the other end suitably engage lower ball joints 36 and 36'.

Figure 3:
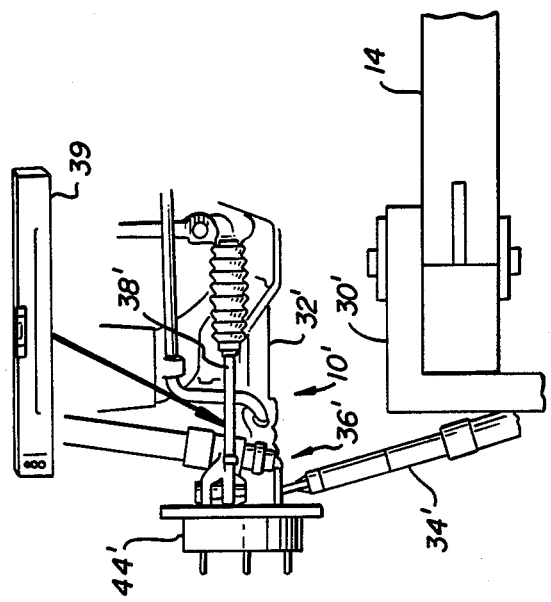
FIG. 3 is a schematic front elevation view of the right front wheel hub in the raised position.

Thereafter, hydraulic cylinders 34 and 34' are used to raise steering linkages 38 and 38' until steering linkages 38 and 38' as well as associated front wheel hubs 44 and 44' are in the normal ride height position (typically horizontal) as depicted in FIG. 3 with respect to steering linkage 38'. This is easily checked using a predetermined height measurement above datum plane 20 for steering linkages 38 and 38' or front wheel hubs 44 and 44', or a level 39 where the normal ride height position of steering linkages 38 and 38' are horizontal. Beam splitter 28 is conveniently used to check that steering linkages 38 and 38' or front wheel hubs 44 and 44' are at the proper height relative to datum plane 20, or that they have the same height at both sides above datum plane 20 where level 39 is used. This is simply done using a tape measure or scale to check the distance from the center of a spindle to datum plane 20. This measurement should be noted and used to similarly raise rear suspension 40 of automobile 12 using similar support brackets and hydraulic cylinders. When measuring the height of the rear wheels, the rear suspension is lifted up to the ride height from datum plane 20. In this position, a complete wheel alignment of both the front and rear wheels of automobile 12 can now be accomplished.

In this preferred embodiment of the present invention, the presence of the wheels and tires of automobile 12 is not necessary and in fact, is not desired. Therefore, preferably, all of the tires and wheels are removed from automobile 12 prior to the beginning of any measurements. This is typically the case anyway when straightening is required of the chassis of automobile 12. In addition, the absence of the tires and wheels allows an easier access and more ready inspection of the front and rear suspensions of automobile 12.

Figure 4:
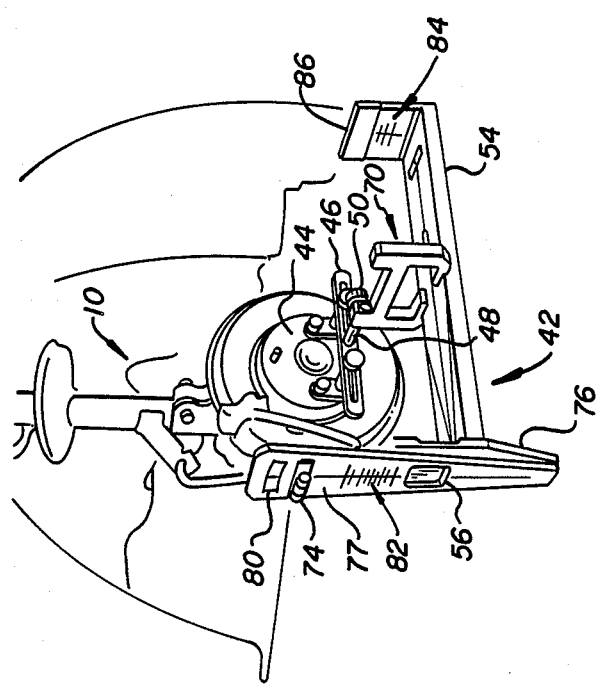
FIG. 4 is a schematic perspective view of the left front wheel hub with a measuring unit attached.

Before measurement can begin, it is necessary to suitably mount a measuring unit 42 to each wheel hub such as shown in FIG. 4 for front wheel hub 44. Measuring unit 42 is preferably one such as manufactured by Nicator AB and designated Dataliner 670 H-50. In order to mount measuring unit 42 to front wheel hub 44, a bracket 46 is used which is adaptable to different sized wheel hubs. Measuring unit 42 is mounted using original wheel bolts/nuts to hold bracket 46 in place. Bracket 46 should be in the lowest possible position as shown in FIG. 4. It should be appreciated that it is not necessary to position axle 48 of bracket 46 on which measuring unit 42 is rotatably mounted in the center of front wheel hub 44. Instead, the position of axle 48 is not critical and can be adjusted and locked in any position as shown in FIG. 4.

In order to check if the mounting of measuring unit 42 is correct, and that front wheel hub 44 is free of warping, locking knob 50 on measuring unit 42 is loosened. When this is done, as shown in FIG. 5, front wheel hub 44 can be rotated independent of measuring unit 42 as measuring unit 42 rotates freely about axle 48. Measuring unit 42 is then turned to the vertical position about axle 48, as shown, and beam splitter 28 is positioned along short rail 26 until the laser dot from laser beam 31 hits camber vertical line 52 on base plate 54 of measuring unit 42. Front wheel hub 44 is then rotated while holding base plate 42 in the vertical position. As this occurs, the laser dot should not move sideways of camber vertical line 52. When the check is completed, the other wheels to be aligned should be similarly checked and then the brakes should be locked (with brackets 46 in the lowest position as described above) by using a brake bar or the like.

Figure 7:
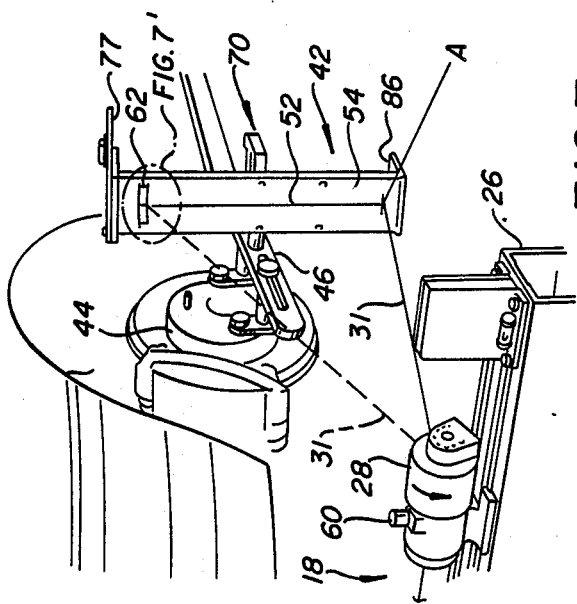
FIG. 7 is a schematic perspective view of a step in checking the camber of the left front wheel hub.
Figure 7:
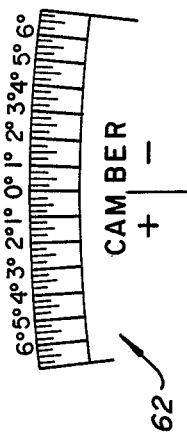

After checking each wheel hub, measuring unit 42 is returned to the horizontal position as depicted in FIG. 6 and measurement for wheel alignment begins. In order to measure for camber, beam splitter 28 is moved along short rail 26 until laser beam 31 is directed through a center band 55 (see FIG. 6') of an angle scale 88 provided on front window 56 to impinge on toe scale 84 of back plate 86 as shown in FIG. 6. Wheel hub 44 is turned until laser beam 31 hits reference line 58 of toe scale 84 (zero toe) so that base plate 54 is thus parallel with laser beam 31. Then, in order to measure camber, measuring unit 42 is moved to the vertical position as shown in FIG. 7. Beam splitter 28 is then moved along short rail 26 and is rotated about initial laser beam 29 by rotation of an adjustment knob 60 until laser beam 31 impinges on point A of camber line 52. Beam splitter 28 is then locked in place along short rail 26 by tightening a locking knob [not shown]. Next, beam splitter 28 is rotated by rotation of adjustment knob 60 so that laser beam 31 (dotted lines) moves vertically upward to camber scale 62 (see FIG. 7). Depending upon whether the wheel is inclined outward at the top or inward at the top, the camber reading will be either positive for outward or negative for inward. This is read in degrees on camber scale 62.

Figure 8:
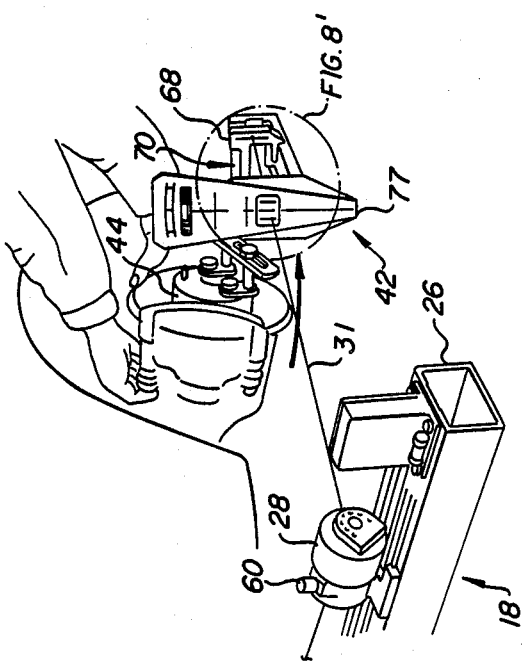
Figure 8:
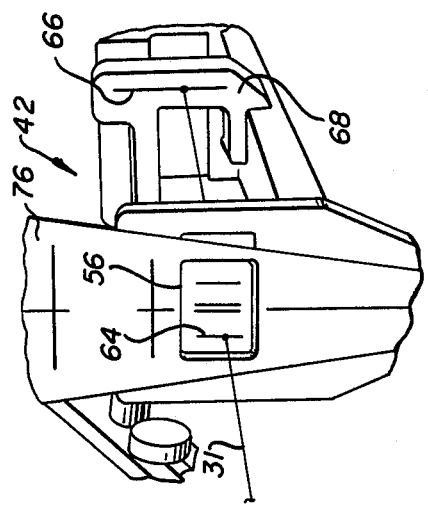
Figure 9:
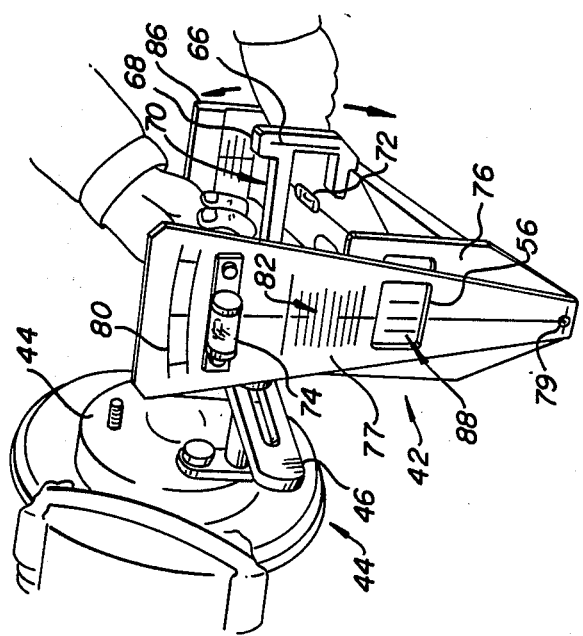

In order to measure the caster of wheel hub 44, wheel hub 44 is initially turned 20° from center as shown in FIG. 8. In order to determine this, measuring unit 42 is turned to the horizontal position and wheel hub 44 is gradually turned outwards. A 20° outward position is achieved when laser beam 31 issuing from beam splitter 28 in datum plane 20 lines up with a 20° line 64 (see FIG. 6') on front window 56 and a reference line 66 provided on leg 68 of attachment bracket 70 (see FIG. 8'). When this alignment occurs, spirit level 72 in base plate 54 is adjusted, after loosening knob 50, to assure that base plate 54 is horizontal. Locking knob 50 is then tightened to maintain this adjustment as shown in FIG. 9.

Figure 10:
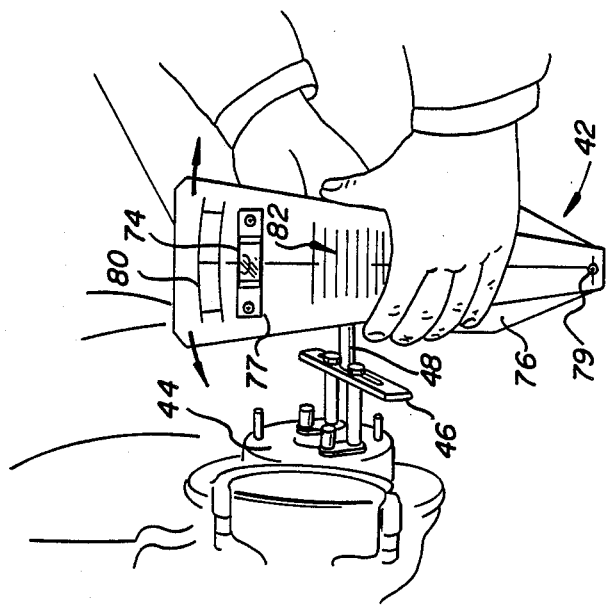

Next, as shown in FIG. 10, spirit level 74 in caster scale plate 77 mounted on front plate 76 is carefully adjusted to assure that caster scale plate 77 is in the vertical position. This is easily accomplished by loosening a locking knob 75 (located behind caster scale plate 77, see FIG. 5) and rotating caster scale plate 77 about a pivot mounting member 79 which attaches caster scale plate 77 to front plate 76. While this is accomplished, care should be taken to make sure that the horizontal orientation of base plate 54 is maintained. When caster scale 77 is vertical, locking knob 75 is again tightened to lock caster scale plate 77 in place against front plate 76.

Figure 12:
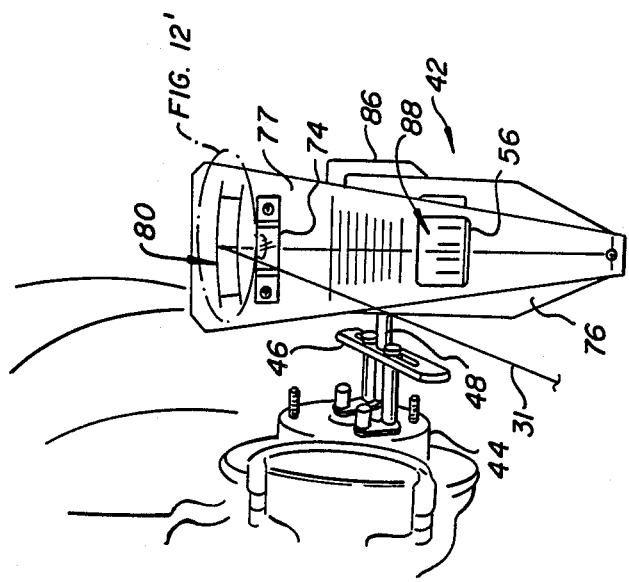
Figure 12:
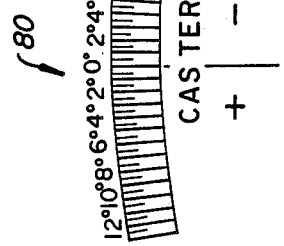
Figure 11:
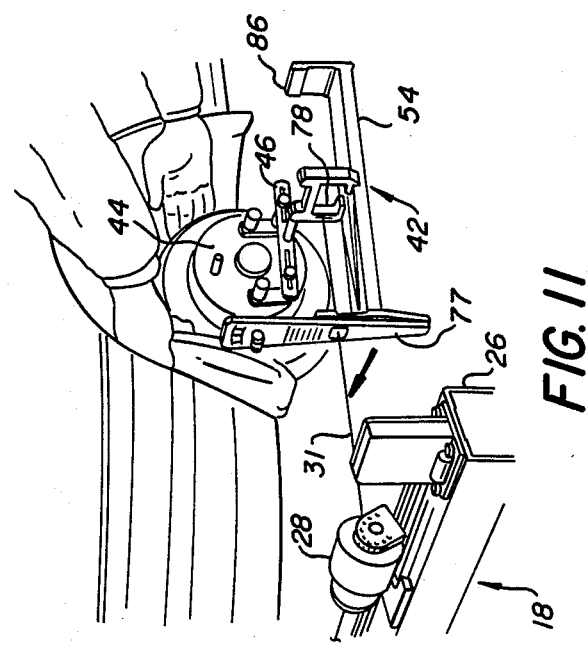

Wheel hub 44 is then turned 20° inward until laser beam 31 lines up with a 20° line on the other side of front window 56 and a reference line on the other leg 78 of attachment bracket 70 as shown in FIG. 11. Beam splitter 28 is then rotated to move laser beam 31 vertically upwards along caster scale plate 77 to the 0° line on caster scale 80 (see FIG. 12'), as shown in FIG. 12. In this position, caster scale plate 77 is no longer vertical. Therefore, locking knob 75 is again slightly loosened and caster scale plate 77 is adjusted until spirit level 74 shows that caster scale plate 77 is vertical, as shown in FIG. 13. When this is done, the position B of laser beam 31 on caster scale 80 is read, as shown in FIG. 13'.

In order to determine steering axis inclination (SAI) or king pin inclination (KPI), beam splitter 28 is rotated after the caster reading is made so that laser beam 31 moves vertically downward to a SAI/KPI scale 82 provided on caster scale plate 77 as shown in FIG. 14. As shown in greater detail in FIG. 14', the 0° mark of SAI/KPI scale 82 is at the top when the camber measurement is made when wheel hub 44 was first turned outward and then inward. The lower 0° line can be used when the opposite procedure is used for measuring camber where wheel hub 44 is first turned inward and then outward 20°. Therefore, laser beam 31 is adjusted in this case to the 0° line corresponding to the top. As shown in FIG. 14', the laser beam 31 is on the 0° line at point C.

Figure 15:
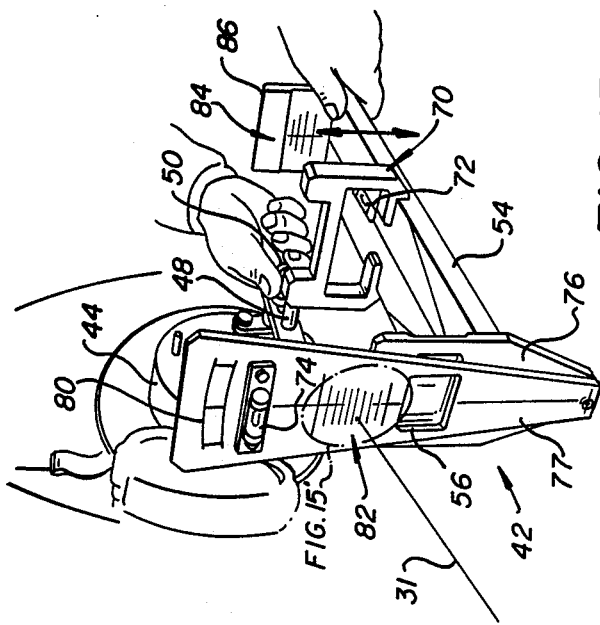
Figure 15:
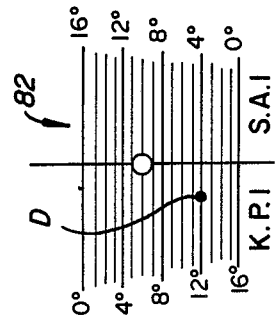

In this position, locking knob 50 is then loosened slightly and base plate 54 adjusted by spirit level 72 until base plate 54 is horizontal. As shown in FIG. 15, as this occurs, laser beam 31 moves along KPI scale 82 as shown in FIG. 15 and 15'. The reading of SAI/KPI scale 82 is then easily made at point D.

After the completion of the above measurements for front wheel hub 44, the same procedure is utilized on front wheel hub 44' to similarly determine the camber, caster, and SAI/KPI for front wheel hub 44'.

Figure 16:
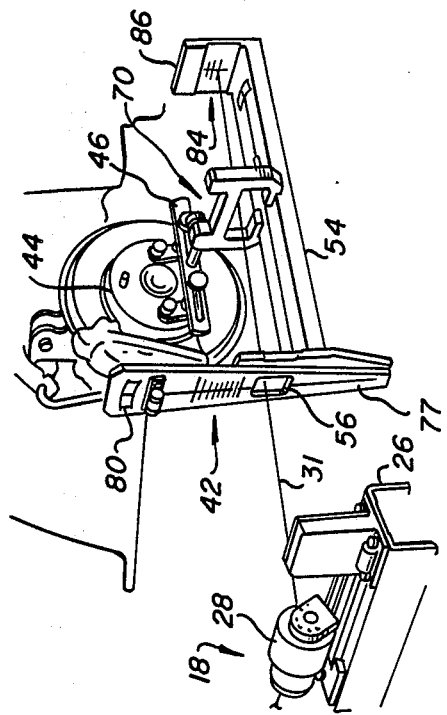
FIG. 16 is a schematic perspective view of a step in measuring the toe of the left front wheel hub.
Figure 16:
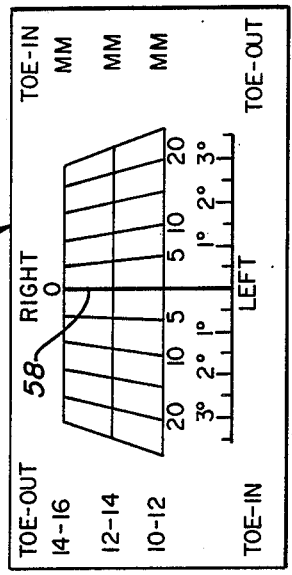

After checking both front wheel hubs 44 and 44', the toe of each wheel hub 44 and 44' is adjusted individually. Starting with wheel hub 44, laser measuring system 18 should again be checked to make sure that beam splitter 28 projects laser beam 31 parallel to centerline 22 of automobile 12. Then, the steering wheel and steering box/rack and pinion of automobile 12 are centered in the straight ahead position. Measuring unit 42 is then positioned with caster scale plate 77 vertical as determined by spirit level 74 and base plate 54 horizontal as determined by spirit level 72. Laser beam 31 is then aimed at the center mark in front window 56 as shown in FIG. 16. After passing through front window 56, laser beam 31 impinges on a toe scale 84 (see FIG. 16') provided on back plate 86 as shown in FIG. 16. If the correct reading according to the specifications is not obtained on toe scale 84, suitable adjustments are made to front wheel hub 44. The same procedure is then used on front wheel hub 44'.

Figure 17:
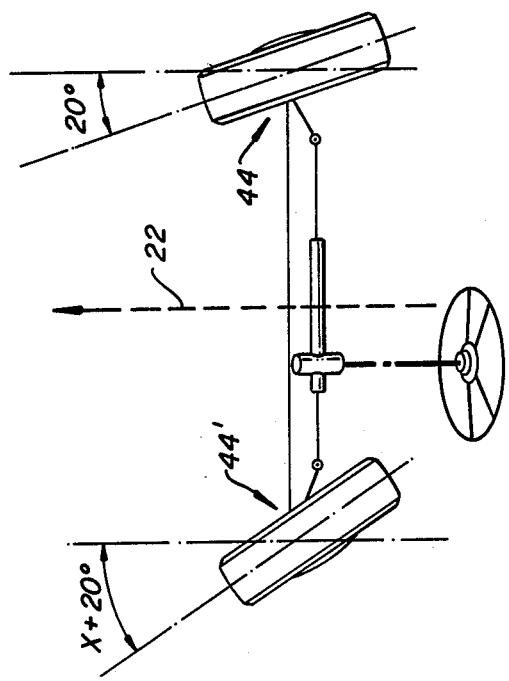
FIG. 17 is a schematic top plan view of the steering of the automobile during a TOOT measurement.

Toe-out-on-turns (TOOT) is checked by turning front wheel hub 44 20° inward (a right hand turn). The achievement of a 20° angle is simply accomplished as discussed above with respect to caster and KPI/SAI measuring. Then, the angle of front wheel hub 44' is determined using laser beam 31 from beam splitter 28. This is accomplished by projecting the laser beam through front window 56 to impinge upon reference line 66 of leg 68. Then, a difference in the angle of front wheel hub 44' can be read as a deviation from the center axis of angle scale 88 (see FIG. 6') provided on front window 56. As shown in FIG. 17, where (outer) front wheel hub 44 has been turned to 20°, the difference "X" of front wheel hub 44' is simply read from angle scale 88. It should be appreciated that while the value of X is usually a positive 2° or so, it can be negative. Next, front wheel hub 44' is turned 20° inward (a left hand turn) and the difference X determined for (outer) front wheel hub 44. Ideally, measurements of X for both front wheel hub 44 and front wheel hub 44' should show the same result or less than a 1° differential. Otherwise, the front wheel hub not having the desired measurement must be corrected.

If desired, it is also possible to measure the alignment of the rear wheels of automobile 12. However, if this is to be done, it should be noted that this alignment should be initially made in order to assure that the thrust line and centerline coincide when measurements of the front wheel alignment are made.

In order to measure the alignment of the rear wheels, it should initially be appreciated that rear axles which move up and down symmetrically and where toe in/out or camber are not affected by wheel suspension, do not have to be lifted up before measuring. However, for all other type of rear axles, the rear axles should initially be lifted up to the ride height position relative to the datum plane. This height measurement should be made from the center of the wheel axle to datum plane 20, which height may or may not be the same as the distance between the front axles and datum plane 20. The lifting of the rear axle to the same height is also shown in FIG. 2.

After raising of the rear axle, toe and camber measurements are made on rear wheel hub 90 in the same manner as discussed above with respect to front wheel hub 44. If desired, the rear axle thrust line can be initially checked to make sure that it coincides with centerline 22 by using another suitable tool, such as tool number 670 H-67 also manufactured by Nicator AB.

Figure 18:
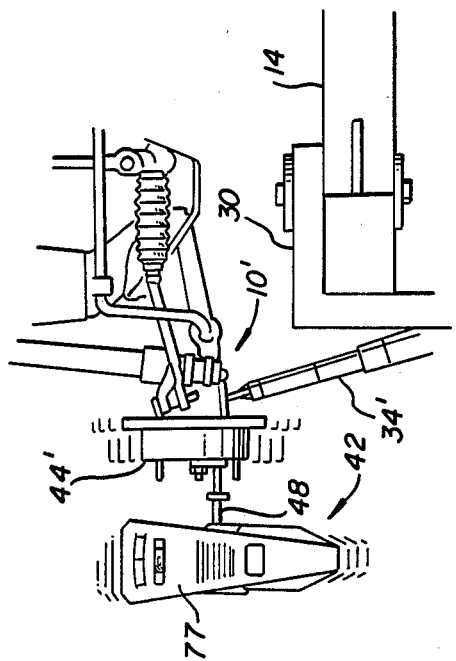
FIG. 18 is a schematic front elevation view of the right front suspension during a jounce/rebound check.

If desired, a jounce/rebound check can also be performed on the front wheels of automobile 12 to determine if a bump steering condition exists. As shown in FIG. 18, hydraulic cylinder 34' is used to raise and lower front suspension 10' approximately 8–10 centimeters to create jounce/rebound conditions. Then, by comparing toe and camber changes before and after this raising and lowering, changes in these measurements can be checked and this condition determined.

While the present invention has been described with respect to an exemplary embodiment thereof, it should be understood by those of ordinary skill in the art that variations and modifications can be affected within the scope and spirit of the invention.

I claim:

1. A method of determining wheel alignment for the wheels of an automobile where a body of the automobile is clamped on a chassis straightening/measuring bench comprising the steps of:
    determining a centerline and datum plane for the automobile;
    calibrating a measuring system to the centerline and datum plane whereby a laser beam is projectable by the measuring system parallel to the centerline in the datum plane and wherein the projection of the laser beam is movable by the calibrated measuring system to selected positions in the datum plane and in a plane perpendicular to the datum plane;
    lifting the front suspension of each front wheel hub relative to the bench until the associated wheel hub is at the normal ride height relative to the datum plane;
    mounting a wheel alignment measuring unit having a plurality of association sales to each front wheel hub;

measuring the camber of each front wheel hub while the wheel hub is lifted by projecting the laser beam onto a predetermined camber scale of the measuring unit;

measuring the caster of each front wheel hub while the wheel hub is lifted by projecting the laser beam onto a predetermined caster scale of the measuring unit;

measuring the SAI/KPI of each front wheel hub while the wheel hub is lifted by projecting the laser beam onto a predetermined SAI/KPI scale of the measuring unit;

measuring the toe of each front wheel hub while the wheel hub is lifted by projecting the laser beam onto a predetermined toe scale of the measuring unit; and measuring the TOOT of each front wheel hub while the wheel hubs are lifted by projecting the laser beam onto a predetermined TOOT scale of the measuring unit.

2. A method of determining wheel alignment as claimed in claim 1 and further including before the calibrating step the steps of: (a) checking the vehicle measurement specifications of the various elements of the vehicle which affect steering geometry, and (b) correcting any of these elements which vary from the specifications.

3. A method of determining wheel alignment as claimed in claim 2 and further including before the lifting step the step of raising and lowering the wheel hub suspension of each front wheel hub to determine whether a bump steering condition exists.

4. A method of determining wheel alignment as claimed in claim 2 and further including before the measuring steps the steps of checking wheel hub run-out of each front wheel hub while the wheel hub is lifted and correcting of any defect adversely affecting proper wheel hub run-out.

5. A method of determining wheel alignment as claimed in claim 2 and further including, together with the other measuring steps, the step of measuring jounce/rebound of each front wheel hub while the wheel hub is lifted.

6. A method of determining wheel alignment as claimed in claim 2 wherein the automobile is initially provided with front wheels having tires thereon, and further including the step of removing the front wheels and tires from the automobile prior to the lifting step.

7. A method of determining wheel alignment as claimed in claim 1 and further including before the measuring steps the steps of: (a) lifting each rear wheel hub relative to the bench up to the corresponding ride height, (b) mounting the wheel alignment measuring unit having a plurality of associated scales to each rear wheel hub, (c) measuring the camber of each rear wheel hub while the rear wheel hub is lifted by projecting the laser beam onto a predetermined camber scale of the associated measuring unit, and (d) measuring the toe of each rear wheel hub while the rear wheel hub is lifted by projecting the laser beam onto a predetermined toe scale of the associated measuring unit.

8. A method of determining wheel alignment as claimed in claim 7 and further including before the measuring steps for each rear wheel hub the step of checking wheel hub run-out of each rear wheel hub while the rear wheel hub is lifted.

9. A method of determining wheel alignment as claimed in claim 7 and further including before the measuring step for the rear wheel hubs the step of checking that the vehicle rear axle thrust line is substantially the same as the vehicle centerline.

10. A method of determining wheel alignment for the wheels of an automobile comprising the steps of:

clamping the chassis of the automobile in a measuring bench;

determining a centerline and datum plane for the automobile;

placing a laser beam projection system adjacent the measuring bench such that a laser beam of the projection system is selectively projectable parallel to the centerline in the datum plane and in a plane which is perpendicular to the datum plane and parallel to the centerline;

lifting the front suspension of each front wheel hub relative to the bench until the associated tie rod is parallel to the datum plane;

mounting a wheel alignment measuring unit having a plurality of associated scales to each front wheel hub;

measuring the camber of each front wheel hub while the wheel hub is lifted by projecting the laser beam onto a predetermined camber scale of the measuring unit;

measuring the caster of each front wheel hub while the wheel hub is lifted by projecting the laser beam onto a predetermined caster scale of the measuring unit;

measuring the SAI/KPI of each front wheel hub while the wheel hub is lifted by projecting the laser beam onto a predetermined SAI/KPI scale of the measuring unit;

measuring the toe of each front wheel hub while the wheel hub is lifted by projecting the laser beam onto a predetermined toe scale of the measuring unit; and measuring the TOOT of each front wheel hub while the wheel hubs are lifted by projecting the laser beam onto a predetermined TOOT scale of the measuring unit.

11. A method of determining wheel alignment as claimed in claim 10 and further including before the calibrating step the steps of: (a) checking the vehicle measurement specifications of the various elements of the vehicle which affect steering geometry, and (b) correcting any of these elements which vary from the specifications.

12. A method of determining wheel alignment as claimed in claim 10 and further including after the measuring steps the step of raising and lowering the wheel hub suspension of each front wheel hub to determine whether a bump steering condition exists.

13. A method of determining wheel alignment as claimed in claim 10 and further including before the measuring steps the steps of checking wheel hub run-out of each front wheel hub while the wheel hub is lifted and correcting of any defect adversely affecting proper wheel hub run-out.

14. A method of determining wheel alignment as claimed in claim 10 wherein the automobile is initially provided with front wheels having tires thereon, and further including the step of removing the front wheels and tires from the automobile prior to the lifting step.

15. A method of determining wheel alignment as claimed in claim 10 and further including before the measuring steps the steps of: (a) lifting each rear wheel hub relative to the bench up to the ride height relative to the datum plane, (b) mounting the wheel alignment measuring unit having a plurality of associated scales to each rear wheel hub, (c) measuring the camber of each rear wheel hub while the rear wheel hub is lifted by projecting the laser beam onto a predetermined camber scale of the associated measuring unit, and (d) measuring the toe of each rear wheel hub while the rear wheel hub is lifted by projecting the laser beam onto a predetermined toe scale of the associated measuring unit.

16. A method of determining wheel alignment as claimed in claim 15 and further including before the measuring steps for each rear wheel hub the step of checking wheel hub run-out of each rear wheel hub while the rear wheel hub is lifted.

17. A method of determining wheel alignment as claimed in claim 15 and further including before the measuring step for the rear wheel hubs the step of checking that the vehicle rear axle thrust line is substantially the same as the vehicle centerline.

* * * * *